United States Patent [19]

Jones

[11] Patent Number: 4,553,998

[45] Date of Patent: Nov. 19, 1985

[54] METHOD FOR PRODUCING GLASS CONTAINERS WITH REDUCED STRAIN

[75] Inventor: William E. Jones, Muncie, Ind.

[73] Assignee: Ball Corporation, Muncie, Ind.

[21] Appl. No.: 623,691

[22] Filed: Jun. 22, 1984

[51] Int. Cl.$^4$ ............................................. C03B 25/00
[52] U.S. Cl. ......................................... 65/69; 65/104; 65/117; 65/119; 65/348
[58] Field of Search ................... 65/117, 69, 104, 118, 65/119

[56] References Cited

U.S. PATENT DOCUMENTS 3,235,353 2/1966 Rupli ................................... 65/69 X
3,388,899 6/1968 Fuller ............................. 65/118 UX

FOREIGN PATENT DOCUMENTS

2058500 5/1971 France ................................... 65/69

Primary Examiner—Arthur Kellogg
Attorney, Agent, or Firm—Gilbert E. Alberding

[57] ABSTRACT

A method is provided for the manufacture of glass containers (10) of the type having a sidewall (12) and having a bottom (16) that is thicker than the sidewall (12). The method comprises a step in which a centered portion (44) of the bottom (16) is cooled subsequent to the molding step. Cooling the centered portion (44) is effective to develop a reverse strain in the transition portion (42a) of the sidewall (12) that is proximal to the bottom (16). This reverse strain corrects the strain that is induced by unequal cooling of a relatively thin sidewall (12) and a relatively thick bottom (16) and results in a reduction of annealing time.

37 Claims, 5 Drawing Figures

METHOD FOR PRODUCING GLASS CONTAINERS WITH REDUCED STRAIN

TECHNICAL FIELD

The present invention relates generally to the manufacture of glass containers and subsequent reduction in strain in the containers, and more particularly to a method for reducing strain in glass containers by a process that is interposed between the molding step and the annealing step.

BACKGROUND ART

It is common for molded glass containers to have a relatively thin sidewall and a relatively thicker bottom. In containers of this type, the relatively thin sidewall cools more rapidly than the bottom. It follows that this unequal cooling results in unrelieved strains remaining in the containers as they cool to room temperature; and if the unrelieved strains that remain are excessive, the container will break during the cooling process or later in storage.

In the manufacturing of molded glass containers, it has been customary to: (1) mold the containers in an individual section molding machine, (2) anneal the containers in a lehr, and then (3) cool the containers to ambient temperature.

In accordance with earlier production methods, a lehr of about 23.7 meters (78 feet) in length and a time of about 60 minutes was typically required to anneal molded glass containers within satisfactory stress levels. Moreover, such a lehr required substantial floor space and took considerable time in properly annealing containers.

In U.S. Pat. No. 3,259,481, Fuller et al., disclosed an improved method for producing glass containers in which the length of the annealing lehr was reduced to about 16.5 meters (54 feet) and the time required for glassware to progress through the lehr was reduced to about 42 minutes.

In the process as disclosed by Fuller et al., the glass containers were reduced in temperature more rapidly while the glassware remained in the upper end of the annealing range; and the temperature of the glassware was reduced more slowly after the temperature of the glassware had been reduced to the lower portion of the annealing range.

Fuller et al., utilized the well known principle that, at higher temperatures within the annealing range, a glass article has the ability to relieve strains more rapidly than at lower temperatures within a given annealing range, and at the strain point, the ability of such a glass article to reduce strain vanishes.

Thus, Fuller et al., achieved a decrease in the annealing time by simply lowering the temperature of the glassware more rapidly in the upper range of annealing temperatures where such rapid reduction would not introduce detrimental stresses into the glassware, and then lowering the temperature of the glassware more slowly in the lower range of annealing temperatures so as to avoid detrimental stresses.

As a part of their process, Fuller et al., sought to achieve uniform cooling of unequal section thicknesses of the glassware. As taught by Fuller et al., (col. 5, lines 20–23), cooling of the conveyor belt "is used to remove heat from the belt and the bottom of the ware in order that the ware temperature reduction will be substantially uniform throughout its mass."

Fuller et al., cooled the conveyor belt by providing one or more rectangularly shaped box sections upon which the conveyor belt rested. Inside each box shaped section baffles were placed that caused or allowed air to traverse back and forth inside the box section from an inlet to an outlet.

Thus, air directed through a rectangularly shaped box section cooled the box section; the cooler upper surface of the box section, upon which the conveyor belt rested, cooled the conveyor belt partially by conduction and partially by radiation; and the glassware was cooled partially by conduction between the bottom of the glassware and the conveyor and partially by radiation.

The objective of cooling the conveyor belt was to achieve uniform cooling of unequal section thicknesses and thereby to reduce the strain that is caused by unequal cooling of differing section thicknesses.

While Fuller et al., achieved a reduction in the annealing time that is required for producing glass containers, an inherent shortcoming in their apparatus and method is that the bottom of the glass containers was cooled both by conduction and by radiation with respect to the conveyor belt.

The contact of a container with a supporting surface typically is provided by a supporting rim that is disposed at, or near, the outer perimeter of the bottom of the container; and the inner portion of the bottom is recessed to provide assurance that the container is supported by the rim.

Thus, with the apparatus and method of Fuller et al., the rims of the glass containers were cooled both by conduction, as provided by contact of the rims with the conveyor belt, and by radiation of heat to the conveyor belt. In contrast, the inner portion of the bottoms were cooled by radiation alone.

Therefore, their method resulted in the bottoms of the containers being cooler near the outer perimeter of the bottoms, as opposed to the temperatures of the portions of the bottoms that were disposed radially inward of the rims.

The relatively small reduction in the annealing time as achieved by Fuller et al., is directly attributable to the fact that the outer periphery of the containers was brought down to a lower temperature than portions of the bottoms that are disposed radially inward. This fact will become apparent from the detailed description of the present invention.

In contrast, the dramatic reduction in annealing time that has been achieved by the present invention is attributable, not only to cooling the bottoms of the glass containers to lower temperatures than the sidewalls thereof, but also to lowering of a substantially centered portion of the bottoms to lower temperatures than the portions of the bottoms that lie radially outward from the cooler centered portions.

DISCLOSURE OF INVENTION

This invention relates to a lehr, and more particularly, to an in-line lehr for receiving and annealing glass articles such as containers, bottles and the like immediately after their manufacture. More particularly, this invention relates to the annealing of glass articles and especially to methods for controlled cooling and annealing of glass articles in a relatively short time while maintaining low levels of resultant stress in the finished articles.

It is well recognized that controlled cooling is important in reducing the stress which appears in glass products as they cool from their molten form or from a temperature to which they were heated to relieve existing internal stresses. High stress values tend to increase the likelihood of breakage and lower the percentage of pack for a given glass forming operation. In one aspect the subject invention addresses a difficulty in handling glass articles which are of various thicknesses or configurations in that certain sections are rapidly cooled in relation to other sections and maintained for certain prescribed periods of time whereafter the different sections are brought to a equalization temperature. In following the teachings of the subject invention, the stress characteristic of the finished product is substantially enhanced, especially as regards glassware of non-uniform wall thickness. The problems associated with such products are more severe with high production rates.

Containers made by commercial processes including so-called lightweight glass containers generally have a thin sidewall and a relatively thicker bottom portion integral therewith. It has been found that better strain patterns are achieved when certain temperature relationships are maintained. In general, the annealing temperature of glass is usually defined as the temperature at which glass has a viscosity of $2.5 \times 10^{13}$ poises and has enough internal mobility to relieve itself of strains.

The subject apparatus includes a pre-cooling section, an annealing section and a post-cooling section, all serially disposed.

In the present invention, a process is introduced intermediate of the molding step and the annealing step that significantly reduces the length of the annealing lehr, and that greatly reduces the time that is required for a glass container to traverse the length of the annealing lehr.

Broadly, the process of the subject invention relates to a method of rapidly annealing a newly formed glass article, such as a container, said article having a thin sidewall and a thicker bottom integral therewith. The method comprises preferentially cooling said newly formed container prior to its introduction into an annealing chamber, said cooling being done to achieve predetermined maximum difference in temperatures between said bottom and sidewall, the higher temperature being at the sidewall, passing the container into the annealing chamber wherein the difference in temperature between the bottom and sidewall are quickly equalized, and thereafter passing said container into a cooling zone whereby said container is brought to substantially ambient conditions. It will be appreciated that there are two cooling zones associated with the subject invention. The structural interrelationship of the first cooling section is a novel feature of this invention in that certain portions of the container are targeted for preferential cooling as opposed to other portions which are not so targeted.

Moreover, the present invention introduces a process into the manufacture of glass containers in which a molded glass container is removed from an individual section glass molding machine; and a substantially centered portion of the bottom of the glass container is cooled to a temperature that is lower than the temperature of the sidewall of the glass container, and lower than the outer perimeter of the glass container, prior to placing the glass container into an annealing lehr.

A method for producing molded glass containers of the type having a sidewall, having an opening in the top thereof, and having a bottom that is relatively thick with respect to said sidewall and that includes both an inside surface and an outside surface, and for reducing the strain in a portion of said sidewall that is proximal to the junction of said sidewall and said bottom that is caused by the inherently faster cooling of said sidewall with respect to said thicker bottom, the method which comprises molding said glass container in a glass molding machine; removing said molded container from said glass molding machine; and cooling only and no other portion of the container a substantially centered portion below the temperature of said sidewall, both said bottom and said sidewall initially being above the annealing range of said glass, whereby said bottom decreases in size because of the thermal coefficient of contraction thereof, whereby said decrease in size of said bottom creates a second strain proximal to said junction of said sidewall and said bottom that is opposite in direction to the first said strain, and whereby said second strain effects a reduction in the first said strain.

Preferably, this selective cooling of a centered portion of the bottom of the container includes: (1) inserting a tube into the open end of the container, (2) directing a fluid which preferably comprises air through the tube and into contact with a substantially centered portion of the inside surface of bottom of the container, and (3) directing air through the mesh of a conveyor belt and into contact with a substantially centered portion of the outside surface of the bottom of the container.

In the preferred process, using the preferred apparatus, a substantially centered portion of both the inside and outside surfaces of the bottom of each glass container is cooled within about a 4 second total application of air at two different stations along the conveyor belt.

While the insertion of the selective cooling process that is disclosed herein, intermediate of the molding machine and the annealing lehr, adds only seconds to the processing time, it results in reducing the time that is required in the annealing lehr to about 4 minutes; and the length of the annealing lehr is reduced to about 9.1 meters (30 feet).

Further, in accordance with the method and apparatus that is disclosed herein, the total time from the glass molding machine to reduction of the temperature of the containers to within the range of about 38 to about 49 degress Celcius (about 100 to about 120 degrees Farenheit) is reduced to about 7.5 minutes.

BEST MODE FOR CARRYING OUT THE INVENTION

Figure 1:
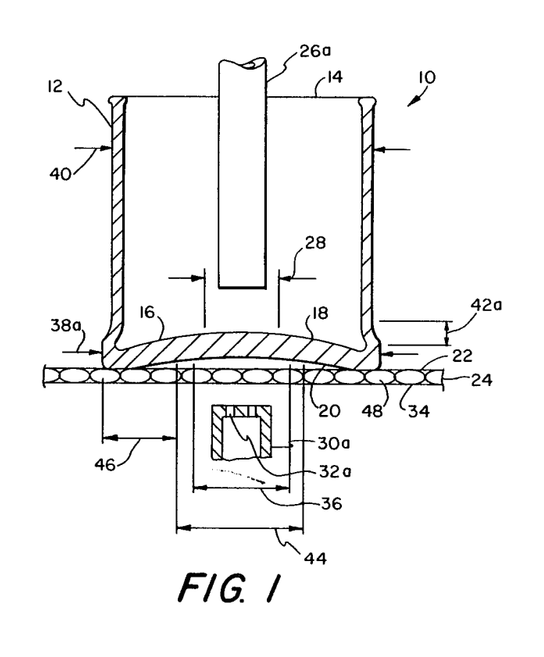
FIG. 1 is a cross sectional view of a container, showing the portion of the apparatus that achieves selective cooling of a substantially centered portion of the bottom of a molded glass container, and illustrating the strain and the resultant distortion that is caused by unequal cooling of a relatively thin sidewall and a relatively thick bottom.
Figure 2:
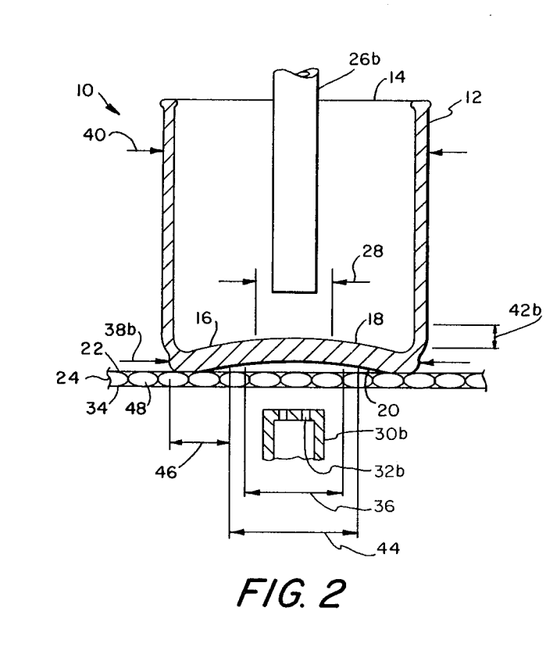
FIG. 2 is a cross sectional view of a container, showing a portion of the apparatus of the present invention, and illustrating corrective strain as produced by the method of the present invention.

Referring now to FIGS. 1 and 2, a molded glass container 10 includes a relatively thin sidewall 12, an open end 14, and a relatively thick bottom 16. The bottom 16 includes an inside surface 18 and an outside surface 20.

The outside surface 20 of the container 10 is resting upon an upper or outer surface 22 of a conveyor belt 24 which is of a metallic mesh or fourdrinierous wire belt type and which serves as a transporting device and supporting device. It is most advantageous and preferred that the belt be preheated, generally between about 900° to about 1000° F.

Referring now to FIG. 1, a first tube 26a has been inserted through the open end 14 of the container 10 and into close proximity to a substantially centered portion 28 of the inside surface 18 of the bottom 16; and a first air conduit 30a, having first jet openings 32a is positioned below a lower or inner surface 34 of the conveyor belt 24 and is centered beneath a substantially centered portion 36 of the outside surface 20 of the bottom 16 of the glass container 10.

The bottom 16 of the container 10 has been shown in FIG. 1 as having a diameter 38a that is larger than an outside diameter 40 of the sidewall 12 in order to illustrate the strain and resultant distortion that is caused by unequal cooling of the sidewall 12 and the bottom 16.

That is, the relatively thin sidewall 12 cools more rapidly than the relatively thick bottom 16; and, because of the more rapid cooling of the sidewall 12 and the thermal coefficient of contraction of the glass, the diameter 40 of the sidewall 12 contracts more than, and becomes smaller than, the diameter 38a of the bottom 16.

This difference in the diameters 40 and 38a, which is rather exaggerated in the illustration of FIG. 1 for purpose of illustration, causes strain in the container 10 in a transition portion 42a.

This distortion begins immediately subsequent to the molding step and even before a newly molded container can be placed into an annealing lehr.

When the container 10 is first moved from the glass molding machine, the temperature of both the sidewall 12 and the bottom 16 are above the upper end of the annealing range; and so the strain and resultant distortion that is illustrated in FIG. 1 does not produce permanent stress in the glass.

Instead, plastic flow of the glass seemingly causes a relative increase in the outside diameter of the portion of the sidewall that has been designated transition portion 42a.

If this increase in diameter of the sidewall 12 in the transition portion 42a remains until the temperature of the transition portion 42a and other portions of the sidewall 12 are reduced in temperature to the strain point of the material, and if the temperature of the bottom 16 remains greater than the temperature of the sidewall, then subsequent cooling of the bottom 16 to room temperature, in equilibrium with the sidewall, will result in excess stress between the sidewall 12 and the bottom 16; and the container may fracture.

The strain that is illustrated in FIG. 1, is intended to illustrate both the plastic strain and the elastic strain in the glass. As stated above, the plastic strain will not cause breakage of the glassware; except that, if the relatively increased diameter of the transition portion 42a remains until the material approaches the strain point, then subsequent reduction in the diameter 38a of the bottom 16 will cause excessive stress in the transition portion 42a.

As the temperatures of the sidewall 12 and bottom 16 reduce, there is an increase in elastic strain and a decrease in plastic strain; so that some of the plastic strain in the transition portion 42a remains as a permanent relative increase in diameter; and breakage will occur unless the glassware is placed in an annealing lehr before the stresses become excessive.

In conventional processing methods, an annealing step is provided in which the temperatures of thinner and thicker sections are equalized as promptly as possible, and then the glassware is maintained in the annealing range until internal stresses are reduced to acceptable levels by plastic strain of the material.

The disadvantage of conventional processing methods is the excessive physical length of the lehr and the excessive time that is required to obtain a satisfactory anneal.

The present invention greatly reduces both the physical length of the lehr and the annealing time by introducing a reverse strain into the glass in the transition portion 42a of the sidewall 12.

This reverse strain is provided by selectively cooling a substantially centered portion 44 of the bottom 16 to a temperature that is lower than the temperature of the sidewall 12. This selective cooling of the portion 44 contracts, or decreases the diameter 38a of the bottom 16, as illustrated in FIG. 1, to the diameter 38b of FIG. 2.

This forced plastic flow reduces the enlargement of the transition portion 42a that was caused by temperatures of the bottom 16 being greater than temperatures of the sidewall 12. This reduction in enlargement is illustrated by a transition portion 42a of FIG. 2.

That is, the reverse strain provides a stress that, with an optimum lowering of the temperature of the substantially centered portion 44 below the temperature of the sidewall 12, can reduce permanent strain and substantially eliminate the stresses that are caused by unequal cooling of different thickness of glassware.

This reverse strain is in the direction that reduces the diameter of the transition portion 42a. Without the selective cooling step of the present invention, this reverse strain occurs naturally; but is occurs after the material of the sidewall 12 and of the transition portion 42a thereof is below the strain temperature of the glass.

Therefore, the reverse strain of the present invention is corrective and results in a lower final stress in the glass containers 10; whereas the reverse strain that occurs naturally in processes of the prior art occurs after the glass is below the strain point of the glass and results in destructive stresses unless the containers are annealed prior to cooling the glass containers 10.

From the preceding discussion, it can be seen that the process would not be nearly so effective if the entire bottom 16 were reduced in temperature, uniformly.

More specifically, if the entire bottom 16 were reduced in temperature, then this reduction in the temperature of the bottom 16 would cause heat to flow from the transition portion 42a to the bottom 16; and this flow of heat from the transition portion 42a to the bottom 16 would reduce the time that the transition portion 42a would remain in the annealing range.

Or, stated another way, this flow of heat from the transition portion 42a would reduce the ability of the transition portion 42a to relieve strain by plastic flow for a given time subsequent to the molding step.

But, since the entire bottom 12 is not cooled uniformly, the heat in a lesser cooled portion 46 of the bottom 16 that lies radially outward of the centered portion 44 remains hotter; so that the lesser cooled portion 46 not only acts as a temperature buffer between the transition portion 42a and the portion 44, but also the heat in the lesser cooled portion 46 provides a reservoir of heat to provide heat to the transition portion 42a and thereby to maintain the transition portion 42a within the annealing range for a greater length of time.

Further, the selective cooling of the substantially centered portion 44 results in a decrease in diameter of the portion 44; and this reduction in diameter of the portion 44 puts a strain on the uncooled portion 46 that tries to pull the uncooled portion 46 radially inward.

Since the uncooled portion 46 has a higher temperature than the selectively cooled portion 44, the uncooled portion 46 has the ability to relieve the strain that is applied thereto by plastic deformation.

This plastic deformation of the uncooled portion 46 cooperates with plastic deformation of the transition portion 42a to reduce the elastic strain that otherwise would be placed on the transition portion 42a upon cooling of the container 10 to room temperature.

Referring again to FIGS. 1 and 2, in a preferred embodiment of the present invention, this selective lowering of the temperature of a substantially centered portion 44 of the bottom 16 below the temperature of the sidewall 12 is accomplished by cooling the portion 44 of the bottom 16 in two successive steps or stages.

More specifically, the glass container 10 is placed on the conveyor belt 24 at a loading station (not shown). The conveyor belt is indexed to a first selective area cooling position as illustrated by FIG. 1.

While the conveyor belt 24 remains at the first selective area cooling position, the first tube 26a is lowered through the open end 14 and into close proximity with the substantially centered portion 28 of the inside surface 18 of the bottom 16; and then air is directed through the tube 26a and into contact with the substantially centered portion 28 of the inside surface 18.

At the same time, while the conveyor belt 24 remains at the first selective area cooling position, air from the conduit 30a is discharged through the first set of jet openings 32a, though openings 48 that are formed by the mesh construction of the belt 24, and into contact with the substantially centered portion 36 of the outside surface 20 of the bottom 16.

Then the belt 24 is indexed to a second selective area cooling position, as illustrated by FIG. 2, a tube 26b is lowered into the container 10, air is directed against the substantially centered portion 28 of the inside surface 18 of the bottom 16 of the container 10 by the tube 26b, and air is directed against the substantially centered portion 36 of the outside surface 20 of the bottom 16 by the second jet openings 32b.

In the presently preferred process, the tubes 26a and 26b have an inside diameter of 6.8 millimeters ($\frac{1}{8}$ inch pipe); and each of the jet openings, 32a and 32b, consists of three openings that are 2.4 millimeters (0.094 inches) in diameter and that are spaced 6.3 millimeters (0.25 inches) apart.

Further, in the presently preferred process, the air supply for the tubes 26a and 26b is regulated to about 0.2 Bars (about 3 psi) and for the conduits 30a and 30b is regulated to about 0.7 Bars (about 10 psi). The tubes 26a and 26b are lowered generally about 0.75 inch from the bottom of the container to be treated.

Figure 3:
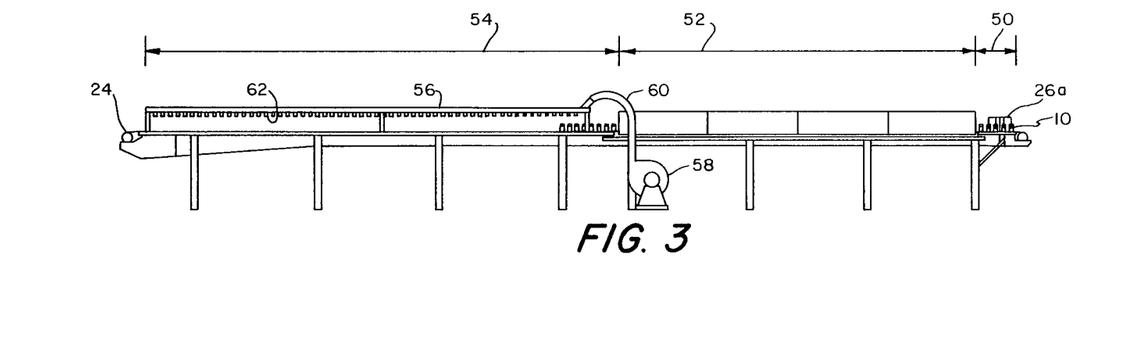
FIG. 3 is a side elevation of the apparatus for performing the steps of the present invention.
Figure 4:
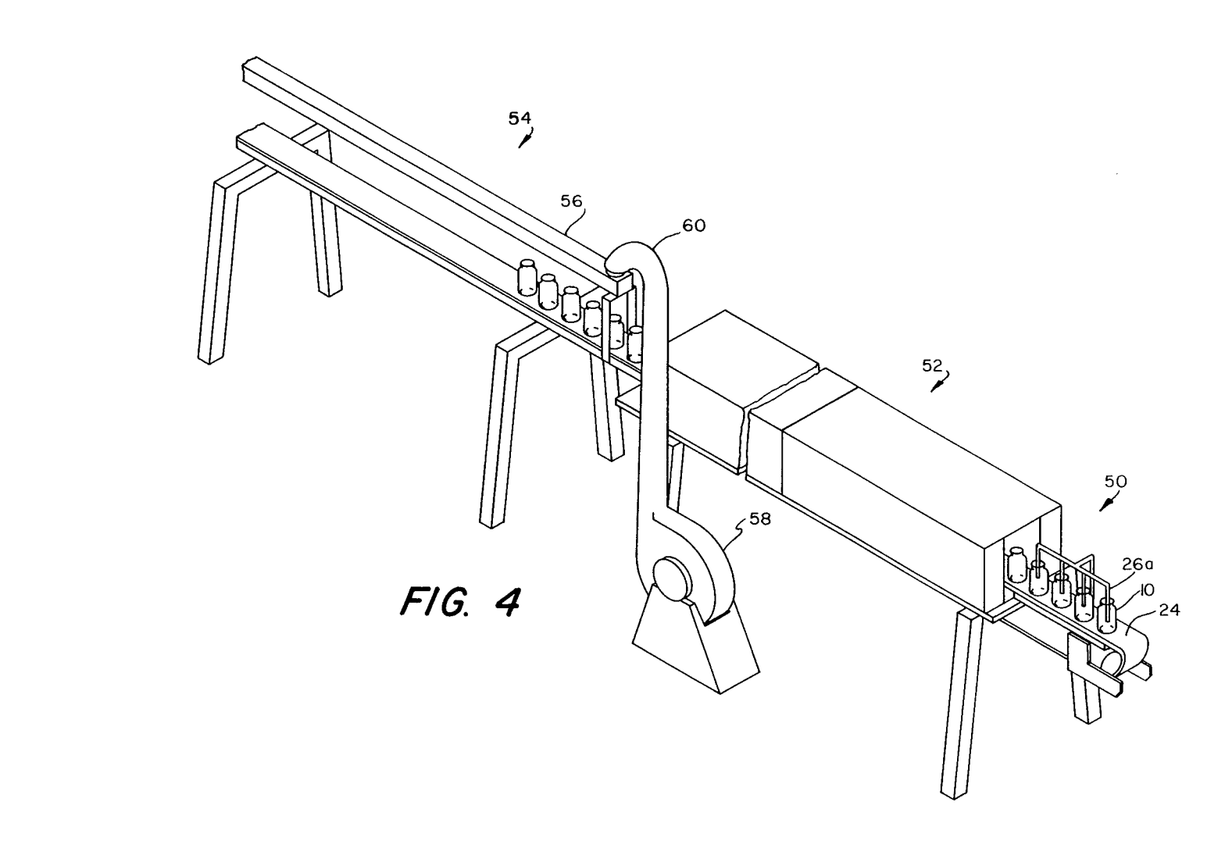
FIG. 4 is a perspective view of the apparatus of FIG. 3.

Referring now to FIGS. 3 and 4, the complete process includes a selective area cooling section 50, an annealing section 52, an aeration section 54, and an individual section glass molding machine (not shown, the details of which do not comprise an inventive part of the present invention).

The conveyor belt 24 conveys the containers 10 through all of the sections 50, 52 and 54.

The selective area cooling section includes the tubes 26a and 26b of FIGS. 1 and 2, two additional tubes (not shown, same as tubes 26a and 26b), the conduits 30a and 30b of FIGS. 1 and 2, and two additional conduits (not shown, same as conduits 30a and 30b). This arrangement may be used for processing containers in pairs from a double-gob IS machine.

The mechanism for lowering and raising the tubes 26a and 26b is not shown; and the details thereof do not form an inventive part of the present invention.

When cooling the substantially centered portion of the bottom of a container it is essential that the jet stream of fluid impinge perpendicularly or essentially so upon said bottom. The initial force of fluid should play and be directed centrally of the bottom and within an area of about one-half or less of the radius of the bottom. No fluid is directed toward the edge of rim portion or toward the outer annular section surrounding the central portion.

The construction of the annealing section 52 is of standard construction; and so the details thereof are not an inventive part of the present invention.

However, the inclusion of the annealing step, in conjunction with the selective area cooling step, is an inventive part of the present invention whenever the selective cooling step does not reduce the elastic strain to acceptable levels without using an annealing step.

The aeration section 54 is an open aeration device including a longitudinally extending duct 56, a blower 58 that is connected to the duct by a conduit 60, and openings 62 in the duct 56 that direct air downward into the containers 10. In general, the openings 62 are spaced apart and comprise each a directed conduit having a diameter of about 0.5 inch regulated to between about 5 to 6 oz., of pressure.

Figure 5:
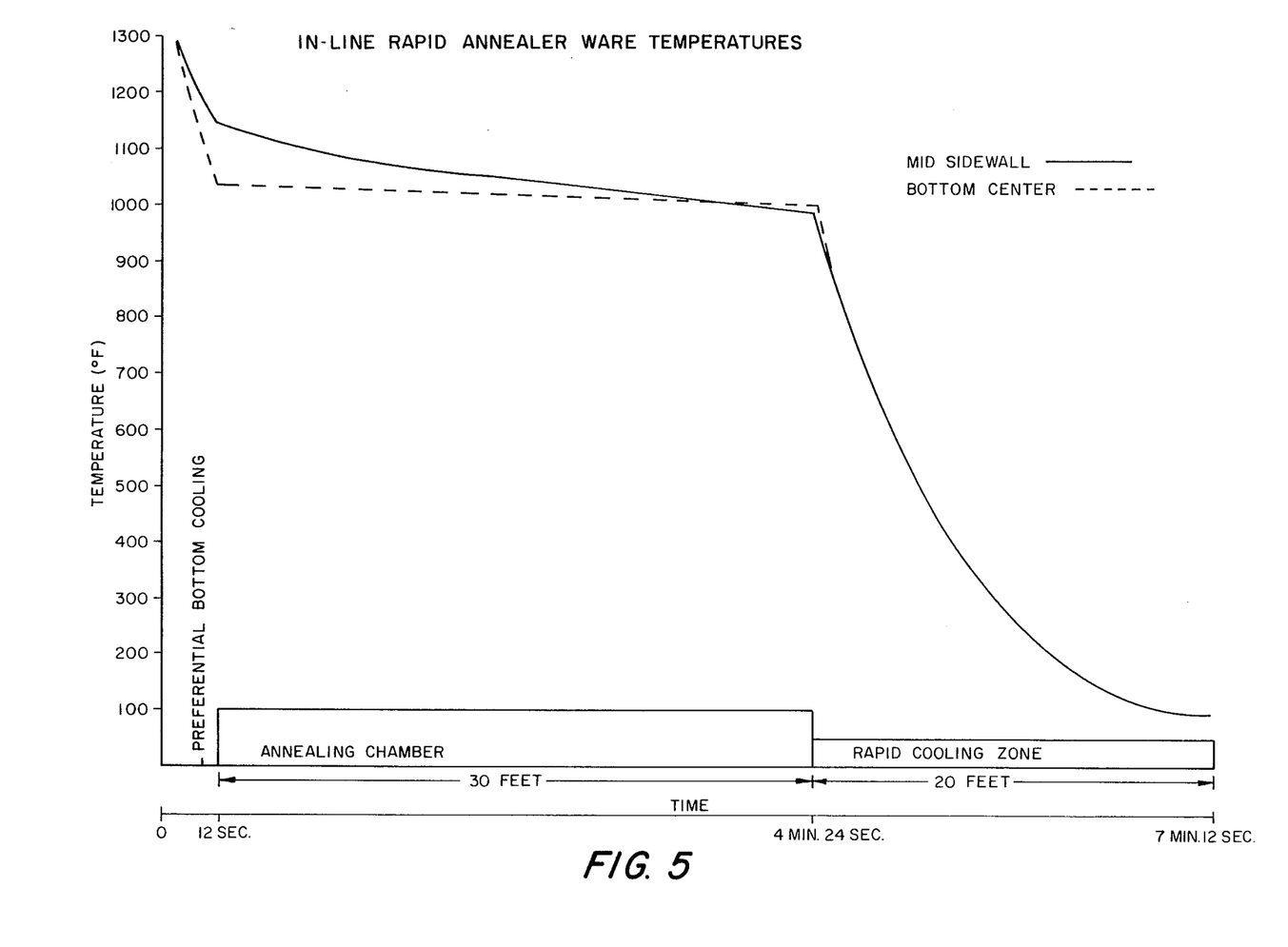
FIG. 5 is a chart showing temperatures vs. times for the various steps of the process.

Referring now to FIG. 5, a chart of times and temperatures of the presently preferred process are shown.

The containers 10 are placed in pairs on the conveyor belt 24 with 10.8 centimeter (4.25 inch) center to center spacing; and the conveyor belt 24 is indexed 21.6 centimeters (8.5 inches) at a time with 2 second moving time and 4 second dwell time at each position.

Therefore, two of the containers 10 receive the first selective area cooling step simultaneously; and then these two containers 10 receive the second selective area cooling step simultaneously as the conveyor belt 24 indexes these two containers 10 to the next selective area cooling position.

As shown in FIG. 5, both the sidewall 12 and the bottom 16 of the container 10 are approximately 700 degrees Celcius (about 1290 degrees Farenheit) as the container 10 enters the selective area cooling section 50.

During the selective area cooling step, which consumes only about 12 seconds, the temperature of the sidewall 12 drops to approximately 620 degrees Celcius (about 1150 degrees Farenheit) and the temperature of the bottom 16 drops to approximately 565 degrees Celcius (about 1050 degrees Farenheit).

In a preferred embodiment during the selective or preferential bottom cooling, the temperature of the substantially centered portion should be generally about 100° F., lower than the sidewall portion. It is also generally the case as to relative thickness that the bottom of the center be about 25 to about 35 percent thicker than the sidewall portion.

The annealing section 52 is about 9.2 meters (about 30 feet) long; and, with the conveyor belt 24 being indexed about 10.8 centimeters (about 8.5 inches) every 6 seconds, it requires about 4 minutes for each container 10 to traverse the length of the annealing section 52.

The containers 10 leave the annealing section 52 with a temperature of approximately 515 to 540 degreees Celcius (about 960 to about 1000 degrees Farenheit); and they are cooled to within the range of about 37.8 to about 48.9 degrees Celcius (about 100 to about 120 degrees Farenheit) as they traverse the about 5.1 meters (about 20 feet) of the aeration section 54 in less than about 3 minutes.

The process as described in detail is effective to produce molded glass containers in which the residual stress is within the range of a number 1 or number 2 anneal, as determined by polariscopic examination. A standard method useful to make this determination may be found in ASTMC 148-77.

In summary, the present process provides a selective area cooling step for the manufacture of glassware of the type having a relatively thin sidewall and a relatively thicker bottom.

This selective area cooling step cools a substantially centered portion 44 of the bottom 16 of a container 10; and the resultant decrease in the diameter 38a of the bottom 16 of the container 10 results in a reverse strain that is effective to reduce the plastic strain that has occurred as a natural function of the relatively thin sidewall 12 reducing the temperature faster than the relatively thick bottom 16.

Even though the total time that is required to provide this reverse strain requires only about 12 seconds, about 4 seconds of which are transport time, the reduction of elastic strain that is achieved by this reverse strain has been effective to reduce the annealing time from the range of about 26 to about 40 minutes down to about 4 minutes.

From these drastic reductions in required annealing time, it can be seen that the reverse strain as described herein is greatly superior to the advantages that can be achieved by merely a rapid equalization of temperatures throughout the glassware, as taught by the prior art.

While specific apparatus, methods, times, and temperatures have been disclosed in the preceding description, it should be understood that these specifics have been given for the purpose of teaching the process of the present invention and that many variations thereof will become apparent to those versed in the art. Therefore, the scope of the present invention is to be determined by the appended claims.

INDUSTRIAL APPLICABILITY

The present invention provides method and apparatus for reducing the strain in molded glass containers of the type that includes a sidewall and a relatively thicker bottom.

The method may be used to reduce the strain in a molded glass container subsequent to the molding step and prior to the annealing step and subsequent cooling of the entire container; or the method may be used subsequent to the molding step and prior to subsequent cooling of the entire container without including the annealing step.

The present invention is applicable to the production of all molded glassware in which unequal cooling of portions having unequal thicknesses presents a problem in production because of the strains, subequent stresses, and breakages that are caused by the unequal cooling.

What is claimed is:

1. A method for producing molded glass containers of the type having a sidewall, having an opening in the top thereof, and having a bottom that is relatively thick with respect to said sidewall and that includes both an inside surface and an outside surface, the method which comprises:
   (a) molding said glass container in a glass molding machine;
   (b) removing said molded container from said glass molding machine;
   (c) exposing said container to air that is cooler than said container, both said bottom and said sidewall initially being in the annealing range of said glass, whereby said difference in thicknesses results in said bottom remaining at a higher temperature and contracting less than said sidewall, and whereby a plastic strain is produced in a transition portion of said sidewall that is proximal to said bottom; and
   (d) cooling a substantially centered portion of said bottom below the temperature of said transition portion, both said bottom and said transition portion intially being in the annealing range of said glass, whereby said bottom contracts because of the thermal coefficient of contraction thereof, whereby said contraction of said bottom creates a second plastic strain in said transition portion that is opposite in direction to the first said plastic strain, and whereby said second plastic strain effects a reduction in the first said plastic strain.

2. A method as claimed in claim 1 in which said cooling step comprises cooling a substantially centered portion of said inside surface of said bottom.

3. A method as claimed in claim 1 in which said cooling step comprises directing a fluid against a substantially centered portion of said inside surface of said bottom.

4. A method as claimed in claim 1 in which said cooling step comprises directing air against a substantially centered portion of said inside surface of said bottom.

5. A method as claimed in claim 1 in which said cooling step comprises:
   (a) inserting a tube into said open end of said container; and
   (b) directing air through said tube and into contact with a substantially centered portion of said inside surface of said bottom.

6. A method as claimed in claim 1 in which said cooling step comprises:
   (a) placing said container on a transporting device;
   (b) indexing said transporting device and said container to a first position;
   (c) inserting a tube into said open end of said container;

(d) directing air through said tube and into contact with a substantially centered portion of said inside surface of said bottom;
(e) removing said tube from said container; and
(f) indexing said transporting device and said container to a second position.

7. A method as claimed in claim 1 in which said cooling step comprises:
(a) placing said container on a conveyor belt;
(b) indexing said conveyor belt and said container to a first cooling position;
(c) inserting a tube into said open end of said container;
(d) directing air through said tube and into contact with a substantially centered portion of said inside surface of said bottom;
(e) removing said tube from said container;
(f) indexing said conveyor belt to a second cooling position;
(g) inserting a second tube into said open end of said container;
(h) directing air through said second tube and into contact with a substantially centered portion of said inside portion of said inside surface;
(i) removing said second tube from said container; and
(j) indexing said conveyor belt and said container to a third position.

8. A method as claimed in claim 4 in which said cooling step further comprises cooling a substantially centered portion of said outside surface of said bottom.

9. A method as claimed in claims 3, 4, or 5 in which said cooling step further comprises directing a fluid against a substantially centered portion of said outside surface of said bottom.

10. A method as claimed in claims 4, 5, 6, or 7 in which said cooling steps further comprise directing air against a substantially centered portion of said outside surface of said bottom.

11. A method as claimed in claims 2, 5, or 7 in which said process comprises annealing said glass container subsequent to said cooling step(s).

12. A method as claimed in claims 2, 5, or 7 in which said method comprises cooling both said sidewall and said bottom to ambient temperature without an annealing step between the first and second said cooling steps.

13. A method as claimed in claim 1 in which said cooling step comprises:
(a) providing a supporting device that includes an upper surface, a lower surface, and opening means for permitting passage of a fluid through said supporting device from said lower surface to said upper surface;
(b) placing said outside surface of said bottom into contact with said upper surface of said supporting device; and
(c) directing a fluid from below said lower surface, through said opening means, and into contact with a substantially centered portion of said outside surface of said bottom.

14. A method as claimed in claim 1 in which said cooling step comprises:
(a) providing a transporting device that includes upper and lower surfaces, and that includes opening means for permitting passage of a fluid through said transporting device from said lower surface through said upper surface;
(b) placing one of said containers onto said transporting device with said outside surface of said bottom in contact with said upper surface of said transporting device;
(c) indexing said transporting device from a loading position to a cooling position; and
(d) directing a fluid from below said transporting device, through said opening means, and into contact with said outside surface of said bottom.

15. A method as claimed in claim 1 in which said cooling step comprises:
(a) providing a conveyor belt of the type that includes outer and inner surfaces, and that includes mesh openings that provide fluid communication between said outer and inner surfaces;
(b) placing said container onto said conveyor belt with said outside surface of said bottom in contact with said outer surface of said conveyor belt;
(c) indexing said conveyor belt to a first cooling position;
(d) directing a fluid from said inner surface of said conveyor belt, through said mesh openings, and into contact with a substantially centered portion of said outside surface of said bottom;
(e) indexing said conveyor belt from said first cooling position to a second cooling position; and
(f) directing a fluid from said inner surface of said conveyor belt, through said mesh openings, and into contact with a substantially centered portion of said outside surface of said bottom.

16. A method as claimed in claims 13, 14, or 15 in which said fluid comprises air.

17. A method as claimed in claims 13, 14, or 15 in which said cooling step comprises cooling a substantially centered portion of said inside surface of said bottom.

18. A method as claimed in claims 13, 14, or 15 in which said cooling step comprises directing a fluid against a substantially centered portion of said inside surface of said bottom.

19. A method as claimed in claims 13, 14, or 15 in which said cooling step comprises directing air against a substantially centered portion of said inside surface of said bottom.

20. A method as claimed in claim 13 in which said cooling step further comprises:
(a) inserting a tube into said container; and
(b) directing air through said tube and into contact with a substantially centered portion of said inside surface of said bottom.

21. A method as claimed in claim 14 in which said cooling step further comprises:
(a) inserting a tube into said container when said transporting device is in said cooling position;
(b) directing air through said tube and into contact with a substantially centered portion of said inside surface of said bottom; and
(c) removing said tube from said container.

22. A method as claimed in claim 15 in which said cooling step further comprises:
(a) inserting a first tube into said container when said conveyor belt is in said first cooling position;
(b) directing air through said first tube and into contact with a substantially centered portion of said inside surface of said bottom;
(c) removing said first tube from said container prior to said conveyor indexing to said second cooling position;

(d) inserting a second tube into said container when said conveyor belt is in said second cooling position; and (e) directing air through said second tube and into contact with a substantially centered portion of said inside surface of said bottom.

23. A method as claimed in claims 13, or 14 in which said method comprises annealing said glass container subsequent to said cooling step.

24. A method as claimed in claims 13, 14, or 15 in which said method comprises cooling both said sidewall and said bottom subsequent to the first said cooling step.

25. A method for producing molded glass containers of the type having a sidewall, having an opening in the top thereof, and having a bottom that is relatively thick with respect to said sidewall and that includes both an inside surface and an outside surface, and for reducing the strain between said sidewall and said bottom, the method which comprises:

(a) molding said glass container in a glass molding machine;

(b) removing said glass container from said molding machine;

(c) placing said container on a conveyor belt of the type that includes mesh openings therethrough with said outside surface of said container in contact with said conveyor belt;

(d) indexing said conveyor belt and said container to a first cooling position;

(e) inserting a first tube into said container;

(f) directing air through said first tube and into contact with a substantially centered portion of said inside surface of said container;

(g) directing air through said first jet means, through said mesh openings of said conveyor belt, and into contact with a substantially centered portion of said outside surface of said bottom;

(h) removing said first tube from said container;

(i) indexing said conveyor belt and said container to a second cooling position;

(j) inserting a second tube into said container;

(k) directing air through said second tube and into contact with a substantially centered portion of said inside surface of said bottom;

(l) directing air through second jet means, through said mesh openings of said conveyor belt, and into contact with a substantially centered portion of said bottom;

(m) removing said second tube from said container; and (n) annealing said container subsequent to said cooling step.

26. A method as claimed in claim 25 in which said annealing step comprises indexing said conveyor belt and said container into an in-line annealing lehr subsequent to the second said removing step; and said method further comprises indexing at the exit of said in-line annealing lehr said conveyor belt and said container into an aeration zone wherein said container is cooled subsequent to said annealing step.

27. A method of rapidly annealing a newly formed glass container produced from an individual section glassware forming machine, said container having a thin sidewall and a thicker bottom integral therewith, said method comprising preferentially cooling said newly formed glass container prior to its introduction into an annealing lehr, said bottom of said container being about 25 to about 35 percent thicker than its sidewall, said cooling being done by directing two spaced apart air currents to impinge upon the base of said container, the impingement being substantially centrally thereon, one current passing externally of the container and another internally of said container whereby the temperature of said base is relatively depressed to about 100° F., lower than the sidewall prior to annealing said container, passing the thus-preferential cooled container through an annealing chamber whereby said difference in temperatures between the bottom and sidewall is essentially equalized, and thereafter conveying the anneled container into a final cooling zone whereby the temperature of the container is brought to about ambient conditions.

28. A method of claim 27 wherein the preferential cooling is accomplished in less than 20 seconds.

29. A method of claim 27 wherein the annealing temperature is essentially between about 1150° F., at the entrance, to about 980° F., at the exit of said chamber, said container passing therethrough in less than about 4 minutes.

30. A method of claim 27 wherein the temperature of the glass container is substantially about 1290° F., shortly after advancing from a dead plate of the individual section glassware forming machine and is thereafter preferential cooled in at least two cooling zones, said zones being provided with inlet nozzles positioned for introduction of air currents internally of the container to a distance slightly above the central base portion of the bottom and a lower jet nozzle situated beneath the inlet nozzle and spaced from said bottom by a distance slightly greater than the thickness of a conveying means upon which said container is being transported through said cooling zones.

31. A method as recited in claim 35 wherein the glass container is brought to a temperature of about 1180° F., for the sidewall thereof and about 1100° F., for the bottom in the first cooling zone and thererafter cooled to about 1150° F., for the sidewall and about 1040° F., for the bottom in said second cooling zone.

32. A process of quickly annealing a glass container comprising forming a glass container having a thin sidewall and a relative thick bottom, thereafter passing air jet streams toward the central portion of said bottom, one stream impinging upon the bottom externally and the other internally to preferentially cool said container to thereby provide a maximum difference in temperature betwen said sidewall and bottom, passing said container into an annealing zone wherein the difference in sidewall and bottom temperature is substantially equalized, and thereafter conveying said container into an aeration zone whereby the container is brought to substantially ambient conditions.

33. A process as recited in claim 32 wherein the container to be passed into the annealing zone has a temperature differential of about 25° F., and 85° F., for the sidewall and bottom, respectively, in relation to the initial annealing chamber temperature.

34. A process as recited in claim 33 wherein the initial and final annealing chamber temperatures are about 1125° F., and 1100° F., respectively.

35. A process as recited in claim 34 wherein the container passes through the annealing zone in about 4 minutes.

36. A process as recited in claim 35 wherein the container leaves the annealing zone having a substantially equalized temperature of between about 960° to about 1000° F.

37. A process as recited in claim 35 wherein the aeration zone includes an array of cooling means situated above said container and provide directly currents of air internally of said container whereby cooling said container from about 980° F., to about 100° F., is brought about in about 3 minutes.

* * * * *